United States Patent Office 3,092,625
Patented June 4, 1963

3,092,625
20-HYDROXY STEROIDS
Oskar Jeger, Zurich, Duilio Arigoni, Zollikerberg, Albert Wettstein, Riehen, and Georg Anner, Karl Heusler, Charles Meystre, Peter Wieland, and Jaroslav Kalvoda, Basel, Switzerland, assignors to Ciba Corporation, a corporation of Delaware
No Drawing. Filed Apr. 19, 1960, Ser. No. 23,157
Claims priority, application Switzerland Apr. 23, 1959
9 Claims. (Cl. 260—239.55)

The present invention relates to a new process for the selective oxidation of polyhydroxy-steroids which makes it possible to oxidize $\alpha:\beta$-unsaturated carbinols selectively to form $\alpha:\beta$-unsaturated ketones in an extremely simple way without affecting any other free hydroxyl groups.

The present invention is of particular importance because many naturally occurring or modified hormones of the androstane and pregnane series contain an $\alpha:\beta$-unsaturated keto grouping, viz. a $\Delta^4$-3-keto group, as well as one or more free hydroxyl groups in other positions of the steroid skeleton. Among these compounds there may be mentioned, for example, testosterone, $11\beta$-hydroxy-testosterone, Reichsteins substance E ($\Delta^4$-3-oxo-$11\beta:17\alpha:20:21$-tetrahydroxy-pregnene) and the like. Other hydroxy-steroids which contain an $\alpha:\beta$-unsaturated keto group are important intermediates for the synthesis of physiologically active compounds; for example $\Delta^4$-3-oxo-20-hydroxy-pregnenes and their derivatives are suitable starting materials for the synthesis of 18-oxygenated steroids which can be converted into the highly active suprarenal cortex hormone, aldosterone.

This conversion is carried out by the process described in patent applications No. 7,525 of February 9, 1960, No. 7,542 of February 9, 1960, and No. 7,543 of February 9, 1960, all by Oskar Jeger et al. These processes consist, for example, in converting $\Delta^5$-3-ethylene-dioxy-$11\alpha$-acyloxy-20-hydroxy-pregnene with lead tetraacetate into the corresponding 18:20-oxido compound and, after ketal cleavage, converting the latter into $\Delta^4$-3-keto-11:18:20-triacyloxy-pregnene by treatment with an acylating agent and after hydrolysis into the free 11:18:20-triol. After oxidation with chromic acid in glacial acetic acid there is obtained the 18→20-lactone of $\Delta^4$-3:11-dioxo-20-hydroxy-pregnene-18-acid which, after ketalization, can be reduced with sodium boron hydride to the 18→11-lactone of $\Delta^5$-3-ethylene-dioxy-$11\beta:20$-dihydroxy-pregnene-18-acid. The 20-hydroxyl group is oxidized to the keto group with pyridine-chromic acid. The conversion of this compound into aldosterone is carried out in known manner by condensing with oxalic ester to the 21-oxalo ester, iodination, treatment with potassium acetate to the 21-acetate and hydrolysis to form the 18→11-lactone of $\Delta^4$-3:20-diketo-$11\beta:21$-dihydroxy-pregnene-18-acid. From the latter the 21-monoacetate of aldosterone is obtained in known manner by ketalization, reduction with lithium aluminum hydried, acetylation and ketal cleavage.

All the above mentioned hydroxylated steroid-$\Delta^4$-3-ketones can be easily prepared by the process of the invention from the corresponding $\Delta^4$-3-hydroxy-compounds.

Various processes have been described for the selective oxidation of $\alpha:\beta$-unsaturated carbinols in the presence of $\alpha:\beta$-saturated carbinol groups. In many cases, for example, this is easily carried out with the aid of active manganese dioxide. As, however, a great excess of the latter must be used, it is often impractical for industrial processes, particularly in the case of compounds which contain more than two hydroxyl groups, these compounds adhering often very strongly to the oxidizing agent and it sometimes being impossible to detach them completely, even with large quantities of solvent. In addition, oxidation with manganese dioxide leads to considerable quantities of further dehydrogenated compounds when the reaction times is longer and/or when the reaction conditions are more vigorous. In the case of $\Delta^4$-3:20-dihydroxy-pregnene, selective oxidation of the 3-hydroxyl group was also carried out with bromacetamide, but the yield is fairly satisfactory only under strictly controlled reaction conditions, as with this oxidizing agent bromine containing by-products are formed in addition to the products oxidized in the 20-position; these by-products make the isolation of the pure $\Delta^4$-3-oxo-20-hydroxy-compound more difficult.

This process could also be carried out with the corresponding 11-oxygenated compounds, for example with $\Delta^4$-$3\beta:20\beta$-dihydroxy-$11\alpha$-acetoxy-pregnene.

Another process for the oxidation of $\Delta^4$-3-hydroxy-steroids in which other hydroxyl groups remain partially unaffected consists in boiling a $\Delta^4$-3-hydroxy-steroid with Raney nickel in acetone. The yield of pure oxidation products, particularly in the case of those which contain further free hydroxyl groups, is inadequate for industrial processes and amounts, for example, to only about 50% in the oxidation of $\Delta^4$-3:17-dihydroxy-androstene to testosterone.

The new process for the selective oxidation of polyhydroxy-steroids consists in treating a steroid with several oxidizable carbinol groups some of which contain a double bond in the $\alpha:\beta$-position, in an aromatic hydrocarbon with a carbonyl compound in the presence of a light metal alcoholate until absorption in ultraviolet light reaches a maximum between 230 and 260 m$\mu$.

As aromatic hydrocarbons there are advantageously used those solvents known for the Oppenauer oxidation, particularly benzene, toluene and xylene; as light metal alcoholates there are suitable more especially the tertiary butylates or isopropylates of aluminum or magnesium which are readily soluble in the mentioned solvents. Halogenous aluminum alcoholates, such as aluminum chlorotertiary butylate or aluminum phenolate, may also be used. As carbonyl compounds there are primarily used ketones, i.e. aliphatic, alicyclic or araliphatic ketones, such as acetone, methyl-ethyl-ketone, methyl-isopropyl-ketone, cyclohexanone, methyl-cyclohexanone, benzophenone, or quinones, such as benzoquinone, naphthoquinone or anthraquinone.

It has been found that $\alpha:\beta$-unsaturated carbinols are oxidized much more rapidly with the above reagents than saturated carbinols so that when the maximum ultraviolet absorption due to the $\alpha:\beta$-unsaturated carbonyl compound formed is reached, the saturated carbinol groups are practically unchanged. The reaction conditions of the present process are therefore substantially milder than those normally used for the oxidation of saturated or $\beta:\gamma$-unsaturated carbinols. The reaction time and temperature depend essentially on the activity of the light metal alcoholate and the oxidation potential of the carbonyl compound used. An industrially, extremely simple method of performing the invention consists, for example, in oxidation with aluminum tertiary butylate and acetone in benzene at 20–25° C. Under these conditions the maximum ultraviolet absorption is reached in a few hours. At a higher temperature or when a carbonyl compound with a higher oxidation potential is used, the reaction time must be shorter. When catalytic quantities of anthraquinone are used as oxidizing agent and the reaction mixture is stirred under oxygen, the course of the oxidation can also be followed by observing the consumption of oxygen for the reoxidation of the anthrahydroquinone formed.

As starting materials there are used $\alpha:\beta$-unsaturated steroid-carbinols, for example $\Delta^4$-3-, $\Delta^5$-7-, $\Delta^{16}$-20-hydroxy-compounds and the like. These are readily accessible by reducing the corresponding $\alpha:\beta$-unsaturated ketones with a complex light metal hydride, such as lithium aluminum hydride, sodium boron hydride, lithium boron hydride, lithium trialkoxy-aluminum hydride; simultaneously with the $\alpha:\beta$-unsaturated keto group reduced saturated ketones remain as carbinol groups after the oxidation according to the present process. The combination of the reduction with the oxidation of the present process is, consequently, in effect a selective reduction of steroid polyketones. It is easily possible to convert $\Delta^4$-androstene-3:17-dione into testosterone and progesterone into $\Delta^4$-20-hydroxy-pregnene-3-one by reduction and subsequent oxidation by means of the present process. Other starting materials are, for example, $\Delta^4$-3:20-dihydroxy-pregnenes substituted in the 11-position by a free or esterified hydroxyl group or by a keto group, or $\Delta^{4:9:11}$-3:20-dihydroxy-pregnadiene; pure alcohols which are epimeric in the 3-position or mixtures of these alcohols can be used.

The present invention further concerns the hitherto unknown 21-unsubstituted $\Delta^4$-3-oxo-20-hydroxy-pregnenes which contain in the 11-position a free or esterified hydroxyl group, a 9:11-double bond or a 9:11$\beta$-oxido group, and their $\Delta^5$-3-ketals. In particular there may be mentioned $\Delta^4$-3-oxo-11$\alpha$:20-dihydroxy-pregnene obtained by the process of the present invention and its 11-monoesters, $\Delta^4$-3-oxo-11$\beta$:20-dihydroxy-pregnene and its 11-monoesters, $\Delta^{4:9:11}$-3-oxo-20-hydroxy-pregnadiene, $\Delta^4$-3-oxo-9:11$\beta$-oxido-20-hydroxy-pregnene and the corresponding $^5$-3-ketals, for example ethyleneketals, hemithioethyleneketals, propylene-ketals and the like. The 11$\beta$-hydroxyl group in the above compounds can be esterified with a lower fatty acid, for example formic acid, acetic acid, trifluoracetic acid, propionic acid and the like, the 11$\alpha$-hydroxyl group can also be esterified with an aromatic carboxylic acid, a benzoic acid or with a sulfonic acid, such as methane-sulfonic acid, benzene-sulfonic acid or para-toluene-sulfonic acid.

The said $\Delta^4$-3-oxo-20-hydroxy-pregnenes can also be prepared by another process, viz. by reducing by the aid of a complex light metal hydride a corresponding 20-oxo-pregnene compound, in which the $\Delta^4$-3-oxo-grouping and any other group sensitive to the reducing agent employed has been previously protected.

The following examples illustrate the invention:

*Example 1*

2.5 grams of crude $\Delta^4$-3:20-dihydroxy-11$\alpha$-acetoxy-pregnene are dissolved in 150 cc. of absolute benzene, 3.0 grams of aluminum tertiary butylate a sufficient quantity of a ketone, such as acetone, methyl-ethyl-ketone, methyl-isopropyl-ketone, cyclohexanone, methyl-cyclohexanone, benzophenone, benzoquinone, naphthoquinone or anthra-quinone are added and the whole allowed to stand for 18 hours at 22–22° C. The course of the oxidation can be followed by taking small test samples and determining the ultraviolet and infrared spectra. For example, after one hour a molar extinction of about 7000 is found at 241 m$\mu$ which corresponds to an oxidation of 47%. In the infrared spectrum the band of the $\Delta^4$-3-ketone at about 6.00$\mu$ is distinctly weaker than the band of the 11$\alpha$-acetate up to about 5.79$\mu$. After three hours the extinction at 241 m$\mu$ has risen to about 11,000 (approximately 75% of the maximum value) and the ketone band is only slightly weaker than the acetate band. After 6 hours an extinction of 12,400 (about 82% of the maximum value) is found and the acetate and ketone bands have the same intensity. After 18 hours the maximum value of the extinction (about 15,000) has been reached and the ketone band is stronger than the acetate band. The reaction mixture is diluted with benzene, washed with 2 N-hydrochloric acid and water, and the dried benzene solution is evaporated in a water-jet vacuum. The amorphous residue (2.65 grams) consists of $\Delta^4$-3-oxo-11$\alpha$-acetoxy-20$\beta$-hydroxy-pregnene mixed with a slight quantity of the 20$\alpha$-isomer.

The above crude ketone is dissolved in 150 cc. of benzene and, after adding 30 cc. of ethylene glycol and 150 mg. of para-toluene-sulfonic acid, boiled under reflux for 16 hours using a water-separator. After cooling, the mixture is diluted with benzene, washed with sodium carbonate solution and water, and evaporated in a water-jet vacuum. The crystalline residue is washed with a little cold methanol and 1.88 grams of pure $\Delta^5$-3-ethylenedioxy-11$\alpha$-acetoxy-20$\beta$-hydroxy-pregnene melting at 214–219° C. are obtained. From the mother liquor about 200 mg. of somewhat less pure ketal precipitate.

The $\Delta^4$-3:20-dihydroxy-11$\alpha$-acetoxy-pregnene used as starting material is prepared as follows: 75 cc. of a 0.4 N-solution of lithium tri-tertiary butoxy-aluminum hydride are added dropwise in the course of 8 minutes to a solution of 2.5 grams of 11$\alpha$-acetoxy-progesterone in 25 cc. of absolute tetra-hydrofuran with stirring and ice-cooling in a dry nitrogen atmosphere. The mixture is then stirred for 12 minutes at 0° to 5° C. and then poured into 200 grams of ice-water which contains 4 cc. of glacial acetic acid and 20 cc. of a saturated Rochelle salt solution. The mixture is extracted several times with methylene chloride, the extracts washed with sodium bicarbonate solution and water, dried and evaporated to dryness. The residue is used directly for oxidation.

*Example 2*

A suspension of 3.04 grams of crude $\Delta^4$-3:11$\alpha$:20-trihydroxy-pregnene in 150 cc. of absolute benzene is stirred for 18 hours at 25° C., with the exclusion of moisture after the addition of 3.0 grams of aluminum tertiary butylate and 12 cc. of acetone; the mixture is then diluted with benzene, washed with hydrochloric acid and water and the dried benzene solution evaporated. 3.01 grams of a solid, colorless crude product are obtained which on the basis of the ultraviolet spectrum (maximum at 241 m$\mu$; $\epsilon$=13,200) consists of about 95% of the mixture of the two $\Delta^4$-3-oxo-11$\alpha$:20-dihydroxy-pregnenes epimeric in the 20-position. In the infrared spectrum the compound shows only the bands of the $\alpha:\beta$-unsaturated ketone at 6.00 and 6.22$\mu$ whereas no saturated ketone is detectable at 5.85$\mu$. By crystallization from a mixture of methanol and ether pure $\Delta^4$-3-oxo-11$\alpha$:20$\beta$-dihydroxy-pregnene is obtained which melts at 170–172° C.; optical rotation $[\alpha]_D$=+70° (in chloroform); ultraviolet maximum at 243 m$\mu$ ($\epsilon$=13,900).

By ketalization with ethylene glycol and para-toluene-sulfonic acid in benzene as described in Example 1 $\Delta^5$-3-ethylenedioxy-11$\alpha$:20$\beta$-dihydroxy-pregnene melting at 208–210° C. is obtained.

The $\Delta^4$-3:11$\alpha$:20-trihydroxy-pregnene used as starting material is prepared by reducing 11$\alpha$-hydroxy-progesterone with lithium aluminum hydride in tetrahydrofuran.

*Example 3*

2.70 grams of crude $\Delta^4$-3:17$\beta$-dihydroxy-androstene are dissolved in 150 cc. of absolute benzene, 3.0 grams of aluminum tertiary butylate a sufficient quantity of a ketone, such as acetone, methylethyl-ketone, methyl-isopropyl-ketone, cyclohexanone, methylcyclohexanone, benzophenone, benzoquinone, naphthoquinone or anthraquinone are added and the whole allowed to stand for 18 hours at 25° C. The mixture is diluted with benzene, washed with hydrochloric acid and water, and the dried benzene solution evaporated in a water-jet vacuum. A crystalline residue is obtained which on the basis of the ultraviolet absorption spectrum contains about 90% of testosterone. By crystallization from aqueous methanol 2.39 grams of pure testosterone melting at 148–150° C. are obtained.

*Example 4*

700 mg. of crude $\Delta^4$-3:17$\beta$-dihydroxy-androstene are dissolved in 100 cc. of absolute benzene and after adding 1.0 gram of aluminum isopropylate and 300 mg. of anthraquinone the whole is stirred under oxygen at 35° C. In the course of 6 hours 42 cc. of oxygen are taken up. The reaction mixture is then diluted with benzene, washed with hydrochloric acid and water, and the dried benzene solution filtered through 10 grams of aluminum oxide and evaporated in a water-jet vacuum. The crystalline residue is taken up in ether, filtered from insoluble anthraquinone, the filtrate evaporated and crystallized from a mixture of ether and hexane. 610 mg. of pure testosterone melting at 147–150° C. are obtained.

*Example 5*

3.6 grams of crude $\Delta^{4:9:11}$-30:20-dihydroxy-pregnadiene are dissolved in 150 cc. of absolute benzene, 3.0 grams of aluminum isopropylate and 12 ml. of acetone are added and the whole allowed to stand for 20 hours at 30° C. After working up as described in Example 4, 3.74 grams of an amorphous residue are obtained which in the ultraviolet spectrum shows a strong absorption ($\epsilon$=12,600) at 241 m$\mu$. In the infrared spectrum in the CO-region only the band of the unsaturated ketone at 6.00$\mu$ is visible. The residue is crude $\Delta^{4:9:11}$-3-oxo-20-hydroxy-pregnadiene.

35 cc. of ethylene glycol and 175 mg. of paratoluenesulfonic acid are added to the solution of the crude product in 200 cc. of benzene, and the whole stirred under reflux for 10 hours at 130° C. bath temperature using a water-separator. After cooling, the mixture is diluted with benzene, washed with sodium bicarbonate solution and water, and the dried benzene solution evaporated in a water-jet vacuum. 4.29 grams of a crystalline residue are obtained from which pure $\Delta^{5:9:11}$-3-ethylene-dioxy-20-hydroxy-pregnadiene is isolated by crystallization from ether. It melts at 167–169° C., $[\alpha]_D=-33°$ (in chloroform); infrared spectrum: bands at 2.75$\mu$ (hydroxyl); 9.18$\mu$ (ketal); further bands at 10.33$\mu$, 10.58$\mu$, 11.55$\mu$ and 12.07$\mu$.

*Example 6*

A solution of 2 grams of $\Delta^4$-3:20-dihydroxy-11$\alpha$-tosyloxy-pregnene and 2.4 grams of aluminum tertiary butylate in 60 cc. of benzene and 9.6 cc. of acetone is stirred for 15 hours at 25° C. internal temperature in a weak current of nitrogen. The mixture is diluted with benzene, washed with dilute hydrochloric acid and water, and the aqueous solutions extracted with fresh benzene. After combining, drying and evaporating the organic solutions in a water-jet vacuum, $\Delta^4$-3-oxo-11$\alpha$-tosyloxy-20-hydroxy-pregnene is obtained in the form of a yellow oil. The infrared spectrum taken in a methylene chloride solution shows no band for a saturated ketone, but at 4:99$\mu$ a strong band which is typical of $\Delta^4$-3-ketones.

On ketalizing the above obtained 20-hydroxy-compound with a mixture of ethyleneglycol and benzene in the presence of para-toluenesulfonic acid there is obtained as main product in addition to a little $\Delta^5$-3-ethylenedioxy-11$\alpha$-tosyloxy-20-hydroxy-pregnene which, when recrystallized from a mixture of methanol and water, melts at 138–139° C. with decomposition, $\Delta^{5:9:11}$-3-ethylenedioxy-20$\beta$-hydroxy-pregnadiene melting at 167–169° C. obtained by splitting off the tosylate group. This compound is identical with that described in Example 5.

The $\Delta^4$-3:20-dihydroxy-11$\alpha$-tosyloxy-pregnene used as starting material is prepared as follows: A mixture of 5.6 grams of tertiary butyl alcohol and 1.4 cc. of tetrahydrofuran is added slowly to a mixture of 960 mg. of lithium aluminum hydride and 20 cc. of tetrahydrofuran with stirring and ice-cooling in a current of nitrogen. When the addition is complete, the whole is stirred for 30 minutes with ice-cooling, and 2 grams of $\Delta^4$-3:20-dioxo-11$\alpha$-tosyloxy-pregnene are then added while rinsing with 1.5 cc. of tetrahydro-furan. The temperature rises to 10° C. but falls again to 0° C. shortly afterwards. 25 minutes later the mixture is diluted with benzene, 50 cc. of saturated Rochelle salt solution and 5 cc. of saturated sodium chloride solution are added cautiously while cooling well, the solution layers are separated and the aqueous solution extracted once more with benzene. The organic solutions are washed with saturated Rochelle salt solution and water, dried and evaporated in a water-jet vacuum. The resulting crude $\Delta^4$-3:20-dihydroxy-11$\alpha$-tosyloxy-pregnene displays no bands in the infrared spectrum between 5.5$\mu$ and 6.0$\mu$ and is used directly for the further steps of the process.

*Example 7*

2.5 grams of crude $\Delta^4$-3:20-dihydroxy-9:11$\beta$-oxido-pregnene are dissolved in 150 cc. of absolute benzene and, after adding 3.0 grams of aluminum isopropylate a sufficient quantity of a ketone, such as acetone, methyl-ethyl-ketone, methylisopropyl-ketone, cyclohexanone, methylcyclohexanone, benzophenone, benzoquinone, naphthoquinone, the whole is allowed to stand for 21 hours at 20–25° C. The mixture is then diluted with 100 cc. of benzene, the solution washed with cold 2-N-hydrochloric acid and water, the benzene solution dried and evaporated to dryness in a water-jet vacuum. The amorphous residue consists of crude $\Delta^4$-3-oxo-9:11$\beta$-oxido-20-hydroxy-pregnene and exhibits in the ultraviolet spectrum a maximum at 240 m$\mu$ ($\epsilon$=12,500).

The so-obtained crude product is dissolved in 150 cc. of benzene and, after the addition of a solution of 150 mg. of para-toluene-sulfonic acid in 30 cc. of ethyleneglycol, the whole is boiled under reflux for 6 hours using a water-separator. The mixture is then cooled, 50 cc. of saturated sodium bicarbonate solution are added with stirring, the whole diluted with 100 cc. of benzene and the aqueous layer separated. The benzene solution is washed with water, dried ad evaporated to dryness in a water-jet vacuum. There are obtained 2.62 grams of crude $\Delta^5$ - 3 -ethylenedioxy - 9:11$\beta$ - oxiodo - 20 - hydroxy-pregnene which is purified by chromatography on 75 grams of aluminum oxide.

The 3:20-diol used as starting material is prepared by reducing 2.5 grams of the known 9:11$\beta$-oxido-progesterone with lithium tritertiary butoxy aluminum hydride as described in Example 1.

*Example 8*

2.68 grams of $\Delta^5$-3-ethylenedioxy-11$\alpha$-acetoxy-20-oxo-pregnene are dissolved in 27 cc. of methanol, 1.00 gram of potassium hydroxide in 3 cc. of water is added and the whole boiled under reflux for 2 hours. After cautiously adding 5 cc. of water, the solution is allowed to cool slowly, the free alcohol crystallizing out in the form of needles. After filtering, washing the crystallizate with about 15 cc. of aqueous methanol (1:1) and drying, 2.0 grams of $\Delta^5$-3-ethylenedioxy-11$\alpha$-hydroxy-20-oxo-pregnene melting at 204–208° C. are obtained. The product can be subjected to tosylation without further purification.

2.00 grams of $\Delta^5$-3-ethylenedioxy-11$\alpha$-hydroxy-20-oxo-pregnene are dissolved in 15 cc. of pyridine and, after the addition of 2.00 grams of para-toluene sulfonic-chloride, the whole is allowed to stand overnight at 20° C. The reaction mixture is poured on to ice-water, stirred for 30 minutes, filtered and washed until neutral with water. The dried residue amounts to 3.00 grams. After recrystallization twice from a mixture of ether and petroleum ether there are obtained 1.80 grams of $\Delta^5$-3-ethylene-dioxy-11$\alpha$-tosyloxy-20-oxo-pregnene melting at 169–170° C. (with decomposition). From the mother liquors another 0.320 gram of the same compound can be isolated.

2.0 grams of $\Delta^5$-3-ethylenedioxy-11$\alpha$-tosyloxy-20-oxo-pregnene are suspended in 120 cc. of methanol and 80 cc. of tetrahydrofuran and, after the addition of 450 mg. of sodium boron hydride, the whole is stirred for 2½ hours at 20° C. Water is slowly added with stirring to the clear solution, $\Delta^5$-3-ethylenedioxy-11$\alpha$-tosyloxy-20$\beta$-hydroxy-pregnene crystallizing out in the form of fine prisms melting at 138–139° C. The filtered crystallisate is thoroughly washed with water and then dried. The yield is 1.74 grams. The compound is recrystallized from a mixture of methylene chloride and petroleum ether.

The product used as starting material in the above example is obtained from 4.0 grams of Δ⁵-3-ethylene-dioxy-11α-acetoxy-20β-hydroxy-pregnene described in Example 1 by oxidation with 4.0 grams of chromium trioxide in 100 cc. of pyridine and 4 cc. of water. The pure Δ⁵-3-ethylenedioxy-11α-acetoxy-20-oxo-pregnene melts after crystallization from a mixture of ether and petroleum ether at 140–142.5° C.

Example 9

20 grams of 11α-acetoxy-progesterone are dissolved in 750 cc. of methanol, 4 grams of sodium boron hydride are added and the whole is allowed to stand for 3 hours at room temperature. After the addition of 10 cc. of glacial acetic acid, the reaction mixture is evaporated under reduced pressure, the residue taken up in ether and water and washed with sodium bicarbonate solution and water. From the ethereal solution there are obtained 20.15 grams of Δ⁴-3β:20β-hydroxy-11α-acetoxy-pregnene as a colorless foam. The resulting product is worked up directly without further purification and dissolved in 130 cc. of absolute benzene and 215 cc. of pyridine, cooled to —20° C. and 9.2 grams of N-bromacetamide added. Stirring is continued for about 15 minutes at the same temperature until all the bromacetamide is dissolved, and the solution which turns yellow is then allowed to stand for 2 hours at —10° C. For working up, the reaction solution is diluted with 1.5 liters of ether and washed in succession with sodium bisulfite solution of 10% strength, water, dilute hydrochloric acid, water, bicarbonate solution and water. The dried solution is evaporated under reduced pressure to yield 19.52 grams of amorphous Δ⁴-3-keto-11α-acetoxy-20β-hydroxy-pregnene. The crude product can be purified by chromatography on aluminum oxide.

A solution of 21.25 grams of this crude Δ⁴-3-ketone in 2 liters of absolute benzene is boiled in a water-separator overnight with stirring after the addition of 300 cc. of ethyleneglycol and 1.2 grams of para-toluenesulfonic-chloride. The cooled reaction mixture is taken up in ether and ice-water and the organic layer is washed once with 500 cc. of saturated sodium bicarbonate solution and five times with 2 liters of water each time. By recrystallizing the residue of the ether extract from methylene chloride and methanol there are obtained 12.13 grams of Δ⁵-3-ethylenedioxy-11α-acetoxy-20β-hydroxy-pregnene melting at 214–217° C.

In an analogous manner there is obtained Δ⁵·⁹⁽¹¹⁾-3-ethylenedioxy-20-hydroxy-pregnadiene by using Δ⁴·⁹⁽¹¹⁾-3:20-dioxo-pregnadiene as starting material.

What is claimed is:

1. A compound of the formula

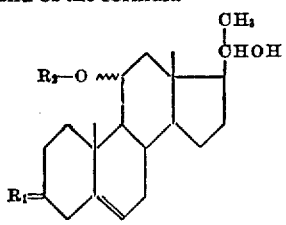

in which $R_1$ is selected from the group consisting of ethylenedioxy, propylenedioxy and 1-thio-4-oxa-butylene, and $R_2$ is an acyl radical selected from those of lower fatty acids, monocyclic carbocyclic aromatic carboxylic acids, lower alkane sulfonic acids and monocyclic carbocyclic aromatic sulfonic acids and the wavy line in the 11-position represents a member selected from the group consisting of an α-oriented and a β-oriented linkage.

2. Pregnadienes of the formula

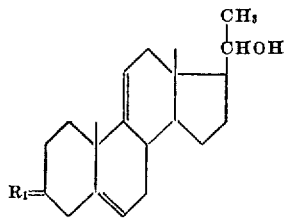

in which $R_1$ is selected from the group consisting of ethylenedioxy, propylenedioxy and 1-thio-4-oxa-butylene.

3. Pregnenes of the formula

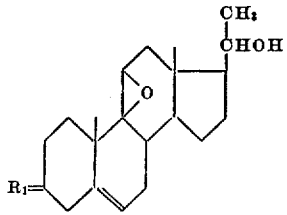

in which $R_1$ is selected from the group consisting of ethylenedioxy, propylenedioxy and 1-thio-4-oxa-butylene.

4. Δ⁵-3-ethylenedioxy-11α-acetoxy-20-hydroxy-pregnene.
5. Δ⁴·⁹:¹¹-3-oxo-20-hydroxy-pregnadiene.
6. Δ⁵·⁹:¹¹-3-ethylenedioxy-20-hydroxy-pregnadiene.
7. Δ⁴-3-oxo-9:11β-oxido-20-hydroxy-pregnene.
8. Δ⁵-3-ethylenedioxy-9:11β-oxido-20-hydroxy-pregnene.
9. Δ⁵-3-ethylenedioxy-11α-tosyloxy-20-hydroxy-pregnene.

References Cited in the file of this patent

UNITED STATES PATENTS

| | | |
|---|---|---|
| 2,920,073 | Murray et al. | Jan. 5, 1960 |
| 2,989,550 | Nathan et al. | June 20, 1961 |

OTHER REFERENCES

Sarett et al.: Journ. Am. Chem. Soc., Vol. 73, pp. 1777–78 (April 1951).

Eastham et al.: Am. Chem. Soc., Vol. 81, p. 2121, June 20, 1959.

Barton et al.: Journ. Chem. Soc. (London), Pt. 4, pp. 5094–95 (1957).

Petit et al.: Pouvoir Rotatoire Naturel, Pt. I (Steroids), p. 21, cpds. 1–n (1956).

UNITED STATES PATENT OFFICE
CERTIFICATE OF CORRECTION

Patent No. 3,092,625                                June 4, 1963

Oskar Jeger et al.

It is hereby certified that error appears in the above numbered patent requiring correction and that the said Letters Patent should read as corrected below.

Column 8, lines 2, 22, and 36, for "-thio-", each occurrence, read -- -thia- --.

Signed and sealed this 5th day of May 1964.

(SEAL)
Attest:
ERNEST W. SWIDER

Attesting Officer

EDWARD J. BRENNER
                                                         Commissioner of Patents